(12) United States Patent
Margalit

(10) Patent No.: US 12,710,925 B1
(45) Date of Patent: Aug. 18, 2026

(54) SYSTEM AND METHOD FOR EFFICIENT EVEN POLYNOMIAL EVALUATION USING TRANSFORMATION-ENHANCED FUSED MULTIPLY-ADD OPERATIONS

(71) Applicant: Next Silicon Ltd, Givatayim (IL)

(72) Inventor: Oded Margalit, Ramat Gan (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/392,316

(22) Filed: Nov. 18, 2025

(51) Int. Cl.
*G06F 7/544* (2006.01)
*G06F 7/499* (2006.01)

(52) U.S. Cl.
CPC ........ *G06F 7/5443* (2013.01); *G06F 7/49957* (2013.01)

(58) Field of Classification Search
None
See application file for complete search history.

(56) References Cited

U.S. PATENT DOCUMENTS 8,949,298 B1 * 2/2015 Langhammer .......... G06F 7/552 708/200
12,288,043 B2 * 4/2025 Rao .......................... G06F 7/72
2014/0359590 A1 * 12/2014 Kodosky ................ G06F 7/483 717/149
2016/0048374 A1 * 2/2016 Argade ................ G06F 7/5443 708/523
2016/0070537 A1 * 3/2016 Drane ..................... G06F 7/483 708/277
2020/0310800 A1 * 10/2020 Parra .................. G06F 9/30038
2025/0004713 A1 * 1/2025 Enenkel ............... G06F 7/5443

* cited by examiner

*Primary Examiner* — Michael D. Yaary

(57) ABSTRACT

A hardware processing system for evaluating degree-2n even polynomials comprises a plurality of fused multiply-add (FMA) units fabricated on a semiconductor substrate, each having dedicated multiplication circuitry and addition circuitry operating in parallel. A scheduling controller with dependency analysis circuitry orchestrates polynomial evaluation by allocating FMA units and configuring hardware interconnect circuitry comprising signal paths, multiplexers, and routing logic. A configuration memory stores pre-computed transformation constants and restructured polynomial coefficients as fixed hardware parameters. The system modifies conventional processor datapath architecture by routing the transformation constant from configuration memory to the addition input of a first FMA unit during squaring operations, productively utilizing addition circuitry that would conventionally receive hardwired zero values. The transformation constant restructures computational dependencies, enabling the scheduling controller to dispatch parallel FMA operations to separate units during the same clock cycle.

19 Claims, 2 Drawing Sheets

FIG. 2

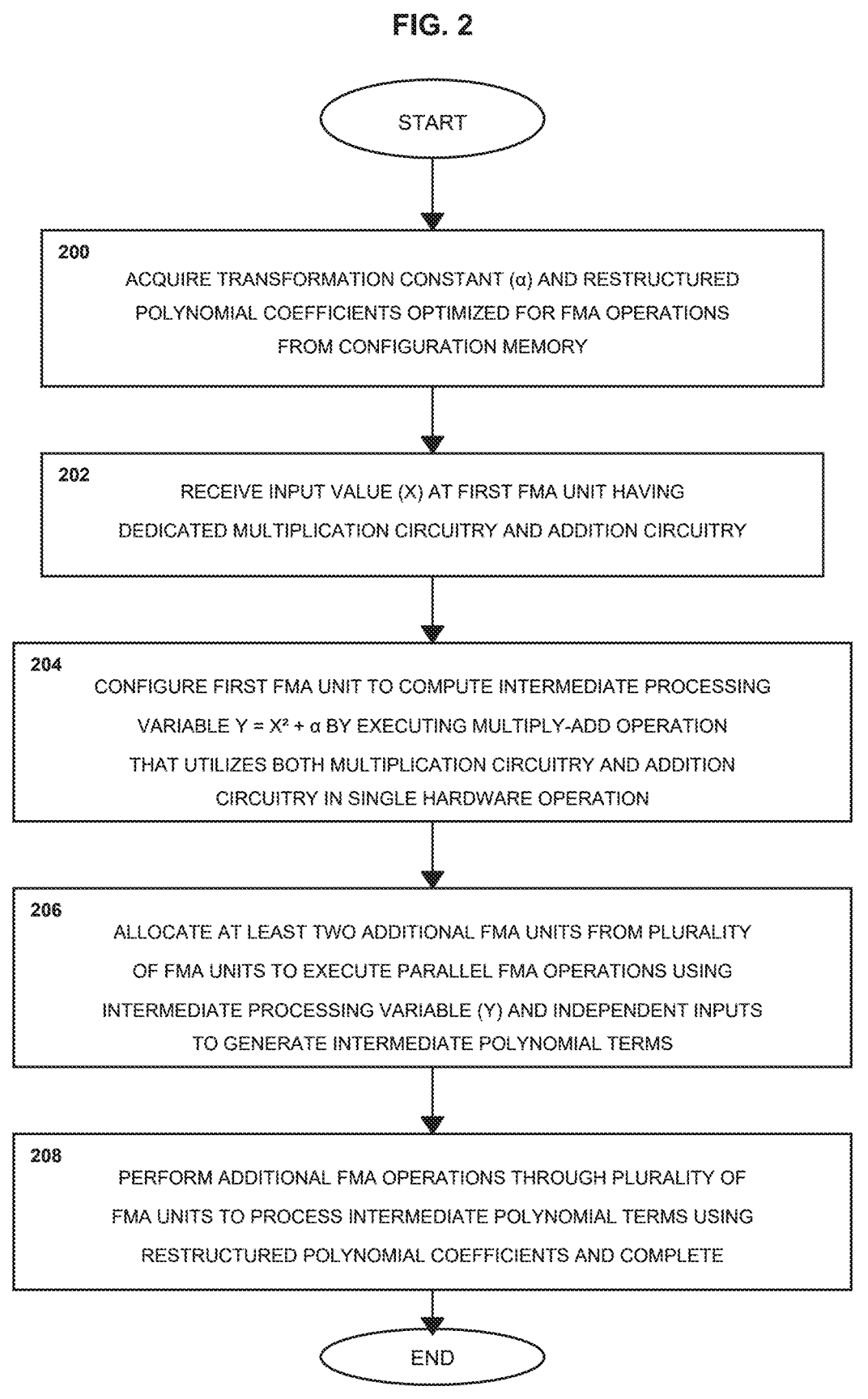

START

Figure 1:
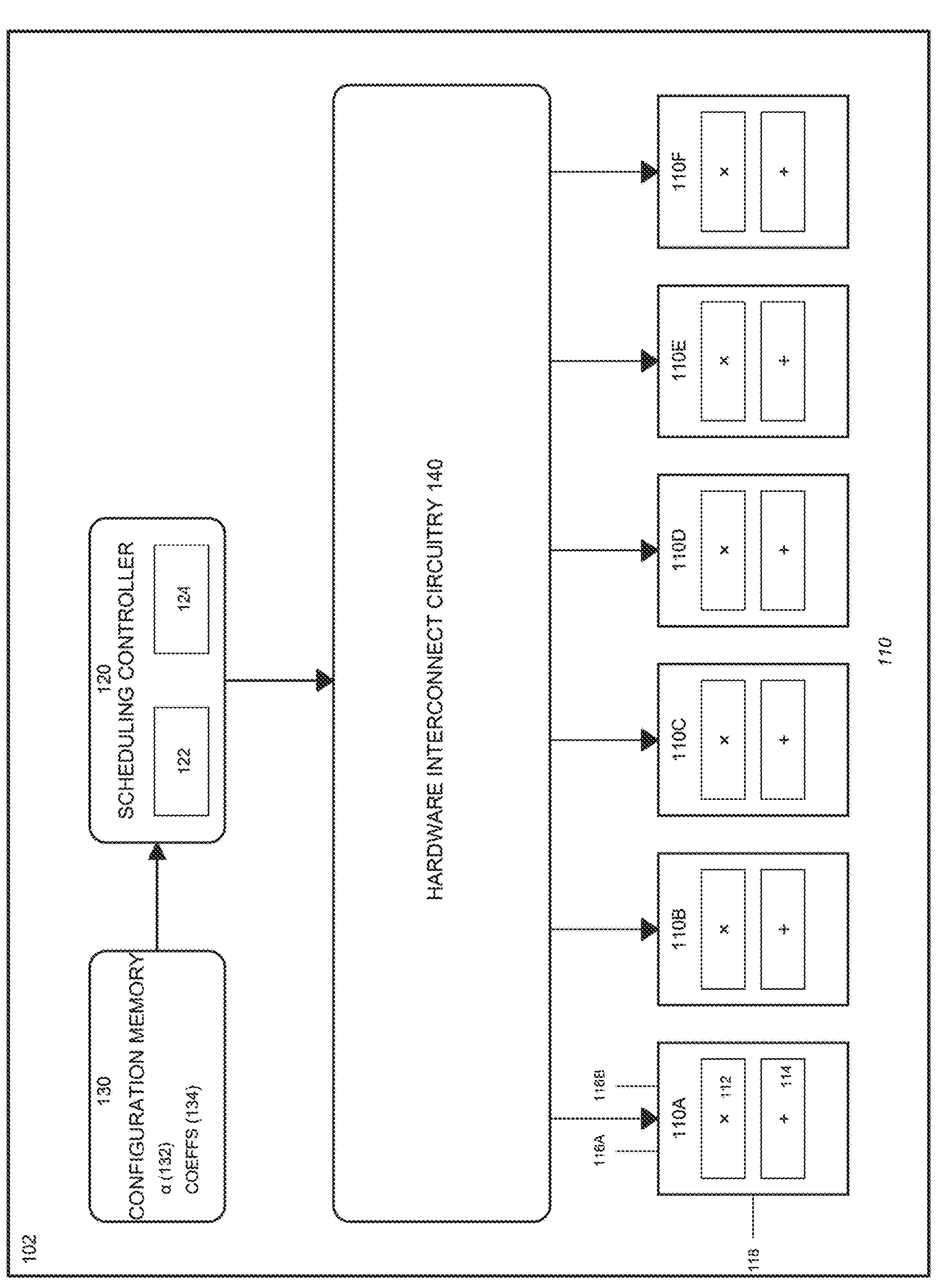

200 ACQUIRE TRANSFORMATION CONSTANT (α) AND RESTRUCTURED POLYNOMIAL COEFFICIENTS OPTIMIZED FOR FMA OPERATIONS FROM CONFIGURATION MEMORY

202 RECEIVE INPUT VALUE (X) AT FIRST FMA UNIT HAVING DEDICATED MULTIPLICATION CIRCUITRY AND ADDITION CIRCUITRY

204 CONFIGURE FIRST FMA UNIT TO COMPUTE INTERMEDIATE PROCESSING VARIABLE $Y = X^2 + \alpha$ BY EXECUTING MULTIPLY-ADD OPERATION THAT UTILIZES BOTH MULTIPLICATION CIRCUITRY AND ADDITION CIRCUITRY IN SINGLE HARDWARE OPERATION 206 ALLOCATE AT LEAST TWO ADDITIONAL FMA UNITS FROM PLURALITY OF FMA UNITS TO EXECUTE PARALLEL FMA OPERATIONS USING INTERMEDIATE PROCESSING VARIABLE (Y) AND INDEPENDENT INPUTS TO GENERATE INTERMEDIATE POLYNOMIAL TERMS 208 PERFORM ADDITIONAL FMA OPERATIONS THROUGH PLURALITY OF FMA UNITS TO PROCESS INTERMEDIATE POLYNOMIAL TERMS USING RESTRUCTURED POLYNOMIAL COEFFICIENTS AND COMPLETE

END

SYSTEM AND METHOD FOR EFFICIENT EVEN POLYNOMIAL EVALUATION USING TRANSFORMATION-ENHANCED FUSED MULTIPLY-ADD OPERATIONS

FIELD AND BACKGROUND OF THE INVENTION

The present invention relates to hardware computation of functions, and more particularly, to efficient evaluation of polynomials using fused multiply-add (FMA) units in digital processors.

FMA units are specialized hardware components found in processors that perform a combined multiplication and addition operation. An FMA unit receives three operands a, b, and c, and computes the result a b+c in a single operation. The operation is "fused" in that the multiplication and addition are performed with a single rounding step, rather than performing two separate operations with two rounding steps. This provides both performance benefits and improved numerical accuracy compared to separate multiply and add operations.

FMA units are standardized in the IEEE 754-2008 floating-point arithmetic standard and are now ubiquitous in modern processors, including graphics processing units (GPUs), central processing units (CPUs), and specialized accelerators for scientific computing and artificial intelligence. An FMA unit may include dedicated multiplication circuitry and dedicated addition circuitry that operate in a pipelined fashion, with the multiplication result feeding directly into the addition operation without an intermediate rounding step.

Polynomial evaluation is a fundamental operation in computer systems. Many functions, including trigonometric functions (sine, cosine), exponential functions, logarithmic functions, and other transcendental functions, are commonly approximated using polynomials. For example, a cosine function may be approximated over a specific interval using a polynomial of degree 12 or higher to achieve acceptable accuracy for engineering and scientific applications.

The conventional approach to polynomial evaluation on hardware with FMA units is the Horner scheme, also known as Horner's method or Horner's rule.

Modern processors contain a plurality of FMA units that can operate in parallel. For example, a high-performance GPU may contain dozens or even hundreds of FMA units. These FMA units represent a significant portion of the processor's silicon area and power budget. The number of FMA units available limits the throughput of polynomial evaluations and other computational tasks that rely on FMA operations.

SUMMARY OF THE INVENTION

According to an aspect of some embodiments of the present invention there is provided a hardware processing system comprises a plurality of floating-point multiply-add (FMA) units each configured with dedicated multiplication circuitry and addition circuitry operating in parallel within each FMA unit, and a scheduling controller configured for instructing a degree-2n polynomial evaluation completed using no more than n FMA operations.

According to some embodiments of the present invention, the scheduling controller acquires a transformation constant ($\alpha$) and a plurality of restructured polynomial coefficients optimized for FMA operations, configures a first FMA unit from the plurality of FMA units to compute an intermediate processing variable (y) by exploiting both the multiplication capability and the addition capability of the FMA unit simultaneously, wherein the transformation constant ($\alpha$) is added during computation of the intermediate processing variable ($y=x^2+\alpha$), and allocates one or more additional FMA units from the plurality of FMA units to execute FMA operations using the intermediate processing variable.

Optionally, the transformation constant ($\alpha$) restructures computational dependencies to enable calculation of intermediate polynomial terms by the one or more additional FMA units using the plurality of restructured polynomial coefficients.

Optionally, the FMA operations compute round $((a\times b)+c)$ in a single operation with single rounding, providing IEEE 754-2008 standard compliance.

Optionally, the one or more additional FMA units use independent inputs during a same clock cycle, enabling parallel computation and reducing overall latency.

Optionally, configuring the first FMA unit to compute the intermediate processing variable comprises computing fma $(x, x, \alpha)$ where x is an input value and a is the transformation constant.

Optionally, the transformation constant $\alpha$ is determined by solving a third-degree polynomial equation derived from a coefficient relationship condition, where the product of a first transformed coefficient and a second transformed coefficient equals the product of a third transformed coefficient and a fourth transformed coefficient.

Optionally, the degree-2n even polynomial represents an approximation of trigonometric functions including cosine functions and normalized sine functions.

Optionally, a configuration memory stores a plurality of sets, each set comprising a transformation constant and restructured polynomial coefficients corresponding to different functions, wherein the scheduling controller selects among the plurality of sets based on a function identifier associated with a current computational workload.

Optionally, the system computes a fifth-degree polynomial segment using four FMA operations, wherein the four FMA operations include at least two FMA operations that execute in parallel using independent inputs.

Optionally, the degree-2n even polynomial has degree twelve, and the parallel FMA operations compute the polynomial using exactly six FMA operations.

Optionally, the system further comprises a compiler configured to analyze function requirements and generate the restructured polynomial coefficients by determining the transformation constant that satisfies relationships of the plurality of restructured polynomial coefficients.

Optionally, hardware interconnect circuitry connects outputs of the first FMA unit to inputs of subsequent FMA units, wherein the scheduling controller configures the hardware interconnect circuitry to enable at least two of the subsequent FMA units to receive input data in parallel during a single clock cycle.

According to some embodiments of the present invention, a computer-implemented method for evaluating even polynomials in a hardware computing system performs degree-2n even polynomial evaluation completed using no more than n FMA operations by acquiring a transformation constant ($\alpha$) and restructured polynomial coefficients, configuring a first FMA unit to compute an intermediate processing variable ($y=x^2+\alpha$), and allocating additional FMA units to execute parallel FMA operations using the intermediate processing variable and independent inputs to generate intermediate polynomial terms.

The present invention provides a significant reduction in the number of FMA operations required for polynomial evaluation while enabling parallel computation, thereby improving computational efficiency and reducing hardware resource utilization in mathematical function approximation applications.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting. Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 1 is a block diagram of a hardware processing system configured for efficient evaluation of degree-2n even polynomials using fused multiply-add units with transformation constant optimization; and FIG. 2 is a flowchart illustrating a method for evaluating even polynomials using restructured computational dependencies and parallel FMA operations.

DESCRIPTION OF SPECIFIC EMBODIMENTS OF THE INVENTION

The present invention relates to hardware computation of functions, and more particularly, to efficient evaluation of polynomials using FMA units in digital processors.

Polynomial evaluation represents a fundamental computational operation in modern processors, yet conventional approaches fail to fully utilize the hardware capabilities of fused multiply-add units when evaluating even polynomials. When a processor evaluates an even polynomial of the form $P(x)=\Sigma_{i=0^n} a_i x^{2i}$ using conventional methods, the first computational step computes $y=x^2$ using an FMA operation of the form fma(x, x, 0). This operation utilizes the multiplication circuitry to compute x–x but provides zero as the addend input to the addition circuitry, effectively wasting the addition capability of the FMA unit. The addition circuitry performs the trivial operation of adding zero to the product, producing no useful computational result from the addition stage despite the circuitry being fully capable of adding any value. Following this wasteful squaring operation, conventional evaluation proceeds using Horner's method to evaluate the polynomial $P'(y)=\Sigma_{i=0^n} a_i y^i$ in the squared variable, requiring n additional FMA operations resulting in a total of n+1 operations. This conventional approach has persisted because Horner's method, known since the 17th century, is provably optimal for general polynomials, and the specific case of even polynomials with FMA hardware has not received focused attention despite FMA units becoming ubiquitous in processors since the 1990s.

The inefficiency manifests directly in hardware utilization metrics and system performance. In high-performance processors, FMA units represent substantial investments in silicon area and power budget, with each unit occupying thousands of square micrometers of semiconductor substrate and consuming milliwatts to watts of power during operation. The number of available FMA units directly limits the throughput of computations, making efficient utilization of these units a critical design objective. When even polynomials are evaluated using n+1 operations, a processor with a fixed number of FMA units can perform fewer polynomial evaluations per unit time than would be possible with a more efficient evaluation method. For example, a processor with 42 FMA units can evaluate only six degree-12 polynomials simultaneously using conventional methods, leaving computational capacity underutilized and limiting throughput in applications that perform billions of trigonometric function evaluations per second for graphics rendering, signal processing, and scientific simulation.

The technical problem addressed by the present disclosure represents a concrete hardware inefficiency that has persisted in processor design despite decades of FMA unit optimization. Conventional processors physically waste dedicated silicon area during polynomial evaluation because the addition circuitry within FMA units remains idle or consumes power to add the constant zero when computing $x^2$ operations. The wasted circuitry cannot be repurposed for other operations during the idle cycles, creating a fundamental architectural bottleneck. Modern graphics processors containing 2,048 FMA units experience this waste simultaneously across all units when evaluating polynomials for vertex transformations, resulting silicon sitting idle during each polynomial evaluation cycle. The present hardware modifications eliminate this waste by physically reconfiguring the datapath to route transformation constants rather than hardwired zeros, converting idle circuitry into productive computational elements The present disclosure addresses this problem through a hardware architecture that restructures polynomial evaluation to eliminate the wasted operation and enable parallel execution of certain computational steps. The hardware architecture allows the determination and storage of transformation constants as fixed hardware parameters in configuration memory, the physical routing of these transformation constants to the addition input of FMA units during the squaring operation, the computation of restructured polynomial coefficients that correspond to the transformed polynomial and exhibit the necessary relationships, and the scheduling controller functionality that identifies and exploits opportunities for concurrent execution of FMA operations with independent inputs.

The hardware implementation may require specific architectural modifications to conventional processor designs. The configuration memory is provisioned with storage capacity for multiple sets of transformation constants and restructured polynomial coefficients, with each set corresponding to a different function such as cosine, sine, exponential, or logarithmic approximations. The hardware interconnect circuitry is configured to route transformation constants from the configuration memory to FMA unit addition inputs, contrasting with conventional processors that would route hardwired zero values for squaring operations. The scheduling controller includes dependency analysis circuitry that examines the restructured polynomial's computational dependencies and identifies operations that can execute concurrently because they use independent inputs. The interconnect circuitry provides fanout capability to broadcast intermediate results to multiple destination FMA units in parallel, enabling multiple operations to receive their input operands during the same clock cycle. These architectural features work together to enable the reduced operation count and concurrent execution that cannot be achieved through software alone running on conventional processor hardware.

Benefits provided by this hardware architecture are substantial and manifest in multiple ways depending on system design choices. The reduction from n+1 to n operations represents approximately a fourteen percent improvement for degree-12 polynomials commonly used in trigonometric approximations. When this savings is multiplied across billions of polynomial evaluations performed during an operation of graphics processors, scientific simulation systems, or signal processing applications, the cumulative benefit becomes significant. In processor configurations where the number of FMA units is fixed, the improved efficiency enables higher throughput, allowing more polynomial evaluations to be performed per unit time. For a processor with 42 FMA units, the ability to evaluate seven degree-12 polynomials simultaneously instead of six represents a 14.3 percent throughput improvement achieved without any increase in silicon area, power consumption, or manufacturing cost. The concurrent execution enabled by the restructured dependencies also reduces latency measured in clock cycles, which is particularly valuable in time-critical applications such as real-time graphics rendering where frame time budgets must be met, or control systems where control loop timing affects stability and responsiveness.

Alternatively or additionally, the improved efficiency can be leveraged to reduce resource requirements or power consumption. A processor designer can choose to fabricate fewer FMA units while maintaining the same polynomial evaluation throughput, thereby reducing silicon area and manufacturing cost. The saved silicon area can be allocated to other functional blocks or left unused to reduce overall die size. In power-constrained environments such as mobile devices and battery-powered systems, the reduced operation count enables the processor to complete computations in less time and spend more time in low-power idle states, or to reduce operating frequency while maintaining the same performance level. Since power consumption often scales quadratically or cubically with frequency depending on whether voltage is scaled, frequency reduction yields substantial power savings. These multiple dimensions of benefit, spanning throughput improvement, latency reduction, resource efficiency, and power savings, make the optimization valuable across a wide range of processor architectures and application domains.

As used herein, a "fused multiply-add unit" or "FMA unit" refers to a hardware arithmetic circuit comprising dedicated multiplication circuitry and dedicated addition circuitry configured to compute a result of the form $a \cdot b + c$ in a single operation with a single rounding step, where a, b, and c are input operands and where the multiplication and addition are performed with the intermediate product forwarded directly to the addition circuitry without intermediate rounding.

As used herein, a "configuration memory" refers to physical memory elements including registers, cache memory, or read-only memory configured to store parameters including transformation constants and restructured polynomial coefficients, where the stored parameters are determined during a compilation phase or hardware configuration phase and remain fixed during runtime polynomial evaluation operations.

As used herein, a "scheduling controller" refers to control circuitry comprising control logic and dependency analysis circuitry configured to orchestrate polynomial evaluation by allocating FMA units from a plurality of FMA units, routing operands through hardware interconnect circuitry, determining which operations can execute concurrently based on data dependencies, and sequencing operations to complete polynomial evaluation.

As used herein, "concurrent execution" or "parallel execution" refers to operation of multiple FMA units during overlapping time periods, including execution during the same clock cycle, pipelined execution with overlapping pipeline stages, or execution with temporal overlap sufficient to reduce either the total number of FMA units required or the latency of polynomial evaluation compared to strictly sequential execution.

As used herein, a "compilation phase" or "hardware configuration phase" refers to a time period occurring prior to runtime operation during which transformation constants and restructured polynomial coefficients are computed through solving equations and performing coefficient transformations, where the compilation phase occurs during processor design, firmware configuration, software compilation, or just-in-time code generation, and where parameters computed during the compilation phase are stored in configuration memory for subsequent runtime use.

As used herein, "independent inputs" refers to a condition where two or more FMA operations receive operands such that neither operation depends on the result of the other operation, enabling the operations to execute concurrently without violating data dependencies.

Reference will now be made in detail to embodiments of the present disclosure, examples of which are illustrated in the accompanying drawings. Wherever possible, the same reference numbers will be used throughout the drawings to refer to the same or like parts.

The hardware processing system described herein addresses technological problems inherent in conventional FMA unit utilization through specific architectural modifications that improve processor efficiency. Embodiments of the present disclosure physically modify processing routes in processor hardware to eliminate architectural bottlenecks and enable new computational capabilities. The transformation constant routing requires dedicated signal paths which may be fabricated during chip manufacturing, while optional parallel execution scheduling may necessitate enhanced control logic with additional transistors and routing resources.

FIG. 1 illustrates a hardware processing system 100 configured for efficient evaluation of degree-2n even polynomials according to an embodiment of the present disclosure. The system 100 comprises a plurality of floating-point multiply-add units 110*a*, 110*b*, 110*c*, 110*d*, 110*e*, 110*f*, collectively referred to as FMA units 110. Each FMA unit 110 is configured with dedicated multiplication circuitry 112 and dedicated addition circuitry 114 that operate in parallel within each respective FMA unit. An FMA unit receives three input operands at its input ports: two multiplicands at multiplication input ports 116*a* and 116*b*, and one addend at addition input port 118. The multiplication circuitry 112 computes the product of the two multiplicands with full precision, producing an intermediate product that is maintained in extended precision format without rounding. This unrounded intermediate product is forwarded directly to the addition circuitry 114, which adds the third operand to produce an intermediate sum. A rounding operation is then applied once to this intermediate sum, for example according to IEEE 754-2008 floating-point standard specifications, producing the final result. This single rounding distinguishes FMA operations from implementations in which multiplication and addition are performed as separate operations, each introducing its own rounding error.

A scheduling controller 120 is operatively coupled to the plurality of FMA units 110 and orchestrates polynomial evaluation operations. The scheduling controller 120 comprises control logic 122 that generates control signals for configuring and allocating FMA units, and dependency analysis circuitry 124 that determines which FMA operations can execute concurrently based on computational dependencies in the restructured polynomial. The dependency analysis circuitry 124 processes information about data dependencies among operations, identifying operations that depend on the same preceding operations but not on each other, thereby establishing candidates for parallel execution.

A configuration memory 130 is coupled to the scheduling controller 120 and stores pre-computed parameters including a transformation constant 132 (designated $\alpha$) and restructured polynomial coefficients 134. The configuration memory 130 is implemented using register files, cache memory, or read-only memory elements that provide rapid access to stored parameters during runtime operation. These parameters are computed during a compilation phase or hardware configuration phase and remain fixed during runtime polynomial evaluation, effectively serving as constants that are retrieved repeatedly but not modified during computational workloads.

Hardware interconnect circuitry 140 connects outputs of FMA units to inputs of subsequent FMA units, enabling data to flow through the processing pipeline. The interconnect circuitry 140 may include signal paths, multiplexers, and routing logic that physically connect the configuration memory 130 to input ports of the FMA units 110. The interconnect circuitry 140 is configurable under control of the scheduling controller 120 to enable multiple FMA units to receive input data in parallel during a single clock cycle. The interconnect architecture may be implemented using crossbar topologies providing full connectivity between sources and destinations, hierarchical topologies balancing connectivity flexibility against circuit complexity, or network-on-chip architectures implementing packet-based communication over structured network topologies.

The FMA units 110 are implemented as dedicated floating-point arithmetic circuits fabricated on a semiconductor substrate 102. Each FMA unit occupies measurable silicon area, for example thousands of square micrometers in modern process technologies, and consumes measurable electrical power during operation, ranging from milliwatts in low-power embedded processors to watts in high-performance computing processors. These physical characteristics establish that the system is concrete hardware rather than an abstract algorithm, with each FMA unit representing substantial investment in chip resources. The area occupied by FMA units and the power they consume directly affect processor cost, performance, and thermal design, motivating the efficiency improvements provided by the present disclosure.

Having described the hardware components, the operation of system 100 during polynomial evaluation will now be explained.

As used herein, an "even polynomial" refers to a polynomial containing only terms with even-degree exponents, expressible in the form $P(x)=\Sigma_{i=o}^{n} a_i x^{2i}$ where the exponents are exclusively even integers (0, 2, 4, 6, . . . , 2n) and where n is a positive integer representing half the polynomial degree.

As used herein, a "degree-2n even polynomial" refers to an even polynomial having a highest-degree term of $x^{2n}$, where the polynomial contains n+1 terms corresponding to powers $x^0$, $x^2$, $x^4$, through $x^{2n}$.

As used herein, a "transformation constant" refers to a pre-computed numerical value, designated $\alpha$, that is added to the squared input value during computation of an intermediate processing variable, where the transformation constant is specifically selected to satisfy conditions enabling reduced operation counts in polynomial evaluation.

As used herein, "restructured polynomial coefficients" refer to a set of coefficients derived from original polynomial coefficients through a transformation involving a transformation constant, where the restructured coefficients enable evaluation of a polynomial in a transformed variable $y=x^2+\alpha$ that is equivalent to the original polynomial in variable x, and where the restructured coefficients exhibit specific relationships enabling reduced FMA operation counts.

As used herein, an "intermediate processing variable" refers to a quantity y computed as $y=x^2+\alpha$ during polynomial evaluation, where x is an input value and $\alpha$ is a transformation constant, and where the intermediate processing variable serves as the argument for subsequent polynomial operations in place of $x^2$ alone.

As used herein, a "coefficient relationship condition" refers to a requirement that the product of specific transformed polynomial coefficients equals the product of other specific transformed polynomial coefficients, expressed as $a'_{n-3} \cdot a'_n = a'_{n-2} \cdot a'_{n-1}$, where satisfaction of this condition enables a fifth-degree polynomial segment to be computed using four FMA operations instead of five operations.

The scheduling controller 120 initiates a degree-2n polynomial evaluation by retrieving the transformation constant 132 and restructured polynomial coefficients 134 from the configuration memory 130. The scheduling controller 120 configures a first FMA unit 110*a* to compute an intermediate processing variable y by executing fma(x, x, $\alpha$), where x is an input value and $\alpha$ is the transformation constant 132. Specifically, the input value x is routed to both multiplication input ports 116*a* and 116*b* of the first FMA unit 110*a*, while the transformation constant $\alpha$ is routed from the configuration memory 130 through the hardware interconnect circuitry 140 to the addition input port 118.

This specific formulation transforms what would conventionally be a computation of fma(x, x, 0) into a productive computation fma(x, x, α). The conventional approach wastes the addition capability of the FMA unit because adding zero produces no useful computational work, whereas the present approach utilizes the addition circuitry 114 productively by incorporating the transformation constant during the squaring operation. Since the multiplication circuitry 112 and addition circuitry 114 operate in parallel within the FMA unit regardless of whether the addend is zero or α, utilizing the addition capability incurs no penalty in terms of execution time, hardware resources, or power consumption.

The multiplication circuitry 112 of the first FMA unit 110*a* computes xx, and the addition circuitry 114 adds a to produce $y=x^2+\alpha$ as the output. This intermediate processing variable y serves as the foundation for all subsequent operations in the restructured polynomial evaluation. The transformation constant α is not arbitrary but is specifically selected to create relationships among transformed polynomial coefficients that enable both parallel execution opportunities and reduced operation counts in subsequent stages of the computation.

The scheduling controller 120 then allocates one or more additional FMA units from the plurality to execute FMA operations using the intermediate processing variable y and the restructured polynomial coefficients 134 as operands. The restructured polynomial coefficients 134 are routed from the configuration memory 130 through the hardware interconnect circuitry 140 to input ports of the allocated FMA units. A first subset of the restructured polynomial coefficients is routed to multiplication input ports 116 of respective FMA units, while a second subset is routed to addition input ports 118, such that each FMA operation computes fma(a, b, c) where at least one operand from the set comprising a, b, and c is a restructured polynomial coefficient 134 retrieved from the configuration memory 130.

The transformation constant α restructures computational dependencies within the polynomial evaluation by establishing specific relationships among the transformed coefficients. These relationships enable multiple FMA operations to execute concurrently rather than strictly sequentially. The dependency analysis circuitry 124 identifies FMA operations that can execute using independent inputs, and the scheduling controller 120 dispatches these operations to separate FMA units during the same clock cycle. For a degree-12 polynomial evaluation, after computing the intermediate processing variable y in FMA unit 110*a*, two subsequent operations may be identified as having independent inputs and dispatched to FMA units 110*b* and 110*c* for parallel execution. The degree-2n polynomial evaluation completes using no more than n FMA operations total, representing a reduction from the conventional n+1 operations.

The incorporation of the transformation constant α into the hardware datapath represents a physical modification to the processor architecture that differs from conventional polynomial evaluation hardware. In conventional processors configured to evaluate polynomials, the addition input port of an FMA unit computing $x^2$ would be hardwired or multiplexed to receive a zero value, with the multiplexer control logic never selecting any other value for this specific operation. The present system modifies this conventional hardware configuration by providing additional signal paths from the configuration memory to the addition input port, modifying multiplexer control logic to select the transformation constant α instead of zero, and provisioning storage capacity in the configuration memory for transformation constants. These physical modifications to signal routing, multiplexer control, and memory allocation constitute concrete changes to the processor's hardware architecture. Furthermore, the selection of the specific value of α affects which data dependencies exist among subsequent FMA operations, thereby changing which operations the scheduling controller can dispatch in parallel. This means a does not merely change what is computed, but physically changes how the hardware operates by enabling different parallel execution patterns that would be impossible, for a general polynomial, with α=0. The hardware is unconventionally configured to exploit what would otherwise be wasted computational capability, transforming the FMA unit from a component that partially idles during polynomial evaluation into one that operates at full utilization.

Optionally, at least two FMA units from the plurality of FMA units 110 using independent inputs operate during a same clock cycle to execute FMA operations in parallel. As previously described, the dependency analysis circuitry 124 identifies operations having independent inputs, meaning neither operation depends on the output of the other. The scheduling controller 120 dispatches both operations to separate FMA units simultaneously within the same clock cycle, with the hardware interconnect circuitry 140 routing appropriate operands to each unit.

This parallel execution provides distinct benefits beyond the operation count reduction. The parallel execution reduces latency measured in clock cycles, because operations that would execute sequentially now execute simultaneously. If two operations with independent inputs were to execute sequentially, the total latency would equal the sum of their individual latencies. With parallel execution, the total latency is determined by the longer of the two operations, which for identical FMA units is simply the latency of a single operation. For polynomial evaluations comprising multiple parallel opportunities, cumulative latency reduction can be substantial.

The hardware modifications implemented in system 100 represent unconventional changes to standard processor architectures. Conventional processors hardwire the addition input of FMA units to receive zero values during squaring operations through dedicated signal traces on the semiconductor substrate. The system according to some embodiments of the invention requires physical rerouting of these traces to instead connect configuration memory outputs to FMA addition inputs through for example additional metallization layers. This rerouting may be implemented based on modifications to the processor's floor plan, with configuration memory blocks positioned within specific distances of FMA units to meet timing constraints, for example within 500 micrometers to ensure single-clock-cycle access. A multiplexer control logic may be redesigned with additional select signals and modified truth tables to choose transformation constants instead of hardwired zeros. These architectural changes affect power distribution networks, as the configuration memory and modified routing consume different power profiles than conventional implementations, requiring redesigned power delivery circuits and potentially additional decoupling capacitors positioned strategically around the modified FMA units.

Additionally, the execution according to some embodiments reduces the peak number of FMA units that must be allocated to polynomial evaluation at any given time. In systems where FMA units are constrained resources shared among multiple computational tasks, this reduction in peak allocation allows other tasks to proceed concurrently with polynomial evaluation, improving overall system throughput. For processors with 42 FMA units, the ability to evaluate seven degree-12 polynomials simultaneously instead of six represents a 16.7 percent throughput improvement achieved without any increase in silicon area, power consumption, or manufacturing cost.

Optionally, the transformation constant α used in the foregoing embodiments is determined through specific relationships that ensure the necessary coefficient conditions are satisfied. The transformation constant is determined by solving a third-degree polynomial equation derived from a coefficient relationship condition. This coefficient relationship condition specifies that the product of a first transformed coefficient and a second transformed coefficient equals the product of a third transformed coefficient and a fourth transformed coefficient, expressed as $a'_{n-3}\cdot a'_n = a'_{n-2}\cdot a'_{n-1}$ where these quantities represent transformed coefficients of the restructured polynomial.

The transformed coefficients are related to the transformation constant α through binomial expansion relationships. When the original even polynomial $P(x)=\Sigma_{i=o}^{n} a_i x^{2i}$ is transformed into $P'(y)=\Sigma_{i=0}^{n} a_i y^i$ where $y=x^2+\alpha$, the transformed coefficients $a'_i$ can be expressed as functions of α and the original coefficients $a_i$ through expansion of terms $(y-\alpha)^i$. Substituting these relationships into the coefficient relationship condition yields a polynomial equation in α, and because the highest-order terms in this derivation involve $\alpha^3$, the resulting equation is a cubic equation.

The cubic equation is solved during the compilation phase or hardware configuration phase that occurs prior to runtime operation. Once a solution do is obtained, it is stored in the configuration memory 130 as the transformation constant 132 for retrieval during runtime polynomial evaluations.

For specific examples, a degree-12 cosine approximation polynomial yields a cubic equation with solution $\alpha\approx-1.828$, while a degree-12 sine approximation yields a different value, approximately $\alpha\approx-1.837$. The transformation constant is function-specific and polynomial-specific, meaning each combination of function and polynomial degree generally requires its own distinct transformation constant. This one-time computational cost during compilation enables ongoing runtime efficiency gains across billions of evaluations, with the per-evaluation cost of the optimization being effectively zero.

Optionally, the degree-2n even polynomials represent approximations of trigonometric functions, specifically cosine functions and normalized sine functions. Trigonometric functions including cos (x) and sin (x)/x are even functions satisfying f(−x)=f(x), meaning their Taylor series expansions naturally contain only even powers of x. This property makes even polynomials the natural choice for approximating these functions. The cosine function cos (πx) is approximated over suitable intervals such as [−1, 1] or [−0.5, 0.5] using polynomials of the form $P(x)=\Sigma_{i=o}^{n} d_i x^{2i}$ where coefficients $d_i$ are determined through approximation theory methods such as Chebyshev approximation, minimax approximation, or least-squares fitting. Similarly, the normalized sine function sin (πx)/x is approximated using even polynomials, with the division by x removing odd-degree terms from the sine function's Taylor series.

Optionally, the system supports evaluation of multiple different functions through a versatile configuration. The configuration memory 130 stores a plurality of sets, each set comprising a transformation constant and restructured polynomial coefficients corresponding to a different function. The configuration memory 130 is organized into multiple storage regions, with each region holding parameters for one function. For example, a first storage region holds the transformation constant and coefficients for cos (πx) approximation, a second storage region holds parameters for sin (πx)/x approximation, a third storage region holds parameters for an exponential function approximation, and additional storage regions hold parameters for logarithm approximations or other functions as needed by the application domain.

The scheduling controller 120 selects among the plurality of sets based on a function identifier associated with a current computational workload. The function identifier may be encoded as an opcode field in an instruction being executed, a register value, a field in a computational descriptor, or another mechanism by which software communicates to the hardware which function is to be evaluated. Upon receiving the function identifier, the scheduling controller 120 uses it as an index or selection signal to access the appropriate storage region in configuration memory 130, retrieving the corresponding transformation constant and restructured polynomial coefficients.

This capability enables the hardware processing system 100 to function as a versatile function evaluation unit that efficiently switches between different functions without reconfiguration delay. In practical processor implementations, workloads often require evaluation of multiple different functions intermixed in the instruction stream. A graphics shader program may evaluate cosine for rotation calculations, exponential functions for lighting falloff, and logarithmic functions for tone mapping, all within a single shader program execution. The switching operation involves only changing which memory addresses are accessed to retrieve parameters, accomplished in a single clock cycle or within the instruction decode stage of the processor pipeline, contrasting with systems requiring parameter loading from external memory or computational element reconfiguration.

Additionally, each set of transformation constant and restructured polynomial coefficients is computed during the compilation phase or hardware configuration phase and remains fixed during runtime polynomial evaluation operations. The compilation phase occurs when a processor is being designed, when firmware is being configured, when software applications are being compiled, or when just-in-time compilers generate optimized code. During this compilation phase, complex operations including solving cubic equations, computing binomial expansions, and restructuring polynomial coefficients are performed using software tools having access to arbitrary computational resources and unlimited time. The results are stored in configuration memory 130 where they remain constant during execution of computational workloads, though they may be read repeatedly as different polynomial evaluations are performed.

Optionally, the computation addresses a fifth-degree polynomial segment using four FMA operations instead of the conventional five operations required by Horner's method. This fifth-degree segment represents the highest-degree terms of the restructured polynomial P'(y) and comprises terms from degree n−5 through degree n, expressed as $\Sigma_{i=n-5}^{n} a'_i y^{i=n+5}$. This is the specific portion of the computation where operation count reduction occurs.

Further optionally, the specific algorithmic sequence for the four FMA operations proceeds as follows. A first intermediate result is computed by multiplying the input value y by itself and adding a first pre-computed offset based on polynomial coefficients, having the form $f_1$=fma(y, y, offset$_1$). Concurrently, a second intermediate result is computed by multiplying a first coefficient by the input value and adding a second coefficient, having the form $f_2$=fma(coeff$_1$, y, coeff$_2$). Because this second operation depends only on y and coefficients but not on the first intermediate result $f_1$, these two operations execute in parallel during the same clock cycle when sufficient FMA units are available.

A third intermediate result is then computed by multiplying the first intermediate result by itself and adding a third pre-computed offset, having the form $f_3$=fma($f_1$, $f_1$, offset$_3$). This operation depends on $f_1$ and therefore executes after the first operation completes. Finally, a fourth intermediate result is computed by multiplying the third intermediate result by the second intermediate result and adding a fourth pre-computed offset, having the form $f_4$=fma($f_3$, $f_2$, offset$_4$). This operation depends on both $f_3$ and $f_2$ and executes after both complete, producing the value of the fifth-degree polynomial segment.

This sequence deviates substantially from Horner's method, which would evaluate the segment sequentially through five FMA operations with completely sequential dependencies. The present factorization enables parallel execution of the first two operations and achieves the result in four operations total. The parallel execution reduces both resource count and latency, as two FMA units executing the first two operations in parallel complete in three total time periods, compared to five sequential time periods required by Horner's method. This represents the portion of the computation where actual savings occur, and combined with the productive use of the addition capability during the initial squaring operation, produces the overall reduction from n+1 to n operations for degree-2n polynomials.

Optionally, the system specifically addresses degree-12 polynomials, which represent a common choice for approximating trigonometric functions with high accuracy while remaining computationally tractable. For even polynomials, degree-12 corresponds to n=6, meaning the polynomial contains seven terms with powers 0, 2, 4, 6, 8, 10, and 12. The system computes such polynomials using exactly six FMA operations, representing a reduction from the conventional seven operations. This reduction of approximately 14.3 percent in operation count, when multiplied across billions of polynomial evaluations, produces substantial cumulative benefits.

Degree-12 approximations provide a balance between accuracy and computational cost. For single-precision floating-point arithmetic with approximately seven decimal digits of precision, degree-12 polynomials achieve approximation errors well below the rounding error inherent in the floating-point representation. For double-precision floating-point arithmetic with approximately sixteen decimal digits of precision, degree-12 polynomials provide good accuracy for many applications, though higher-degree polynomials may be used when greater accuracy is required. The present method scales to higher degrees while maintaining the n-operation count for degree-2n polynomials.

Optionally, the system includes compiler support to address practical deployment. The system comprises a compiler configured to analyze function requirements and generate the restructured polynomial coefficients by determining the transformation constant that satisfies polynomial coefficient relationships. The compiler is a software tool executing on a computing system during the development or configuration phase, prior to deployment of the hardware processing system for runtime operation. The compiler receives as input a specification of the function to be approximated, accuracy requirements, and the domain over which the approximation is valid.

The compiler may perform polynomial approximation(s) to determine initial polynomial coefficients for approximating the specified function. These approximation(s) produce polynomial coefficients that minimize approximation error according to various criteria. The compiler then may perform transformation to compute restructured polynomial coefficients by formulating transformed coefficients as functions of a transformation constant α, constructing the cubic equation ensuring the coefficient relationship condition is satisfied, solving the cubic equation to obtain α, and computing all restructured coefficients using binomial expansion formulas with the determined value of α. The compiler outputs the transformation constant and complete set of restructured coefficients, formatted for storage in configuration memory of the hardware processing system.

Conventional processors lack the configuration memory storing multiple sets of function-specific transformation constants with rapid selection mechanisms, lack the modified datapath routing the transformation constant to the FMA unit addition input during the squaring operation, and lack the scheduling controller with dependency analysis circuitry configured to recognize and exploit the specific parallel execution opportunities created by the coefficient relationships. The present disclosure, in some embodiments thereof, teaches physical modifications to processor architecture including additional storage elements, modified interconnect routing, enhanced multiplexer control logic, and specialized scheduling controller functionality. These hardware modifications enable the reduced operation count and parallel execution that cannot be achieved through software executing on unmodified conventional hardware.

Optionally, the physical implementation addresses routing of the transformation constant within the processor datapath. The transformation constant is stored in the configuration memory 130 as a fixed hardware parameter determined during a hardware configuration phase prior to runtime operation. The configuration memory includes dedicated storage locations for transformation constants, organized such that each function has an associated transformation constant storage location. During the hardware configuration phase, which occurs during processor initialization, firmware loading, or system boot, the transformation constants are loaded into their designated storage locations through mechanisms varying depending on memory technology used.

The scheduling controller 120 retrieves the transformation constant 132 from the configuration memory 130 when initiating a polynomial evaluation and routes it to the addition input 118 of the first FMA unit **110*a*. This routing involves configuring multiplexers within the hardware interconnect circuitry 140** to establish a signal path from the configuration memory output to the FMA unit input. The datapath width matches the floating-point format being used, for example 32 bits for single precision or 64 bits for double precision, with routing occurring within a single clock cycle or during the instruction decode stage.

This routing behavior contrasts with conventional implementations that route the constant zero to the addition input when computing $x^2$. In conventional implementations, a multiplexer at the addition input would select a hardwired zero value for the $x^2$ computation. In the present implementation, the multiplexer instead selects the transformation constant α retrieved from configuration memory. This represents a concrete architectural change involving physical signal paths and control logic, demonstrating that the optimization involves specific modifications to the processor's datapath architecture rather than merely a software-level change.

The implementation of transformation constant routing may require specific modifications to the semiconductor substrate and metallization stack. Standard FMA unit layouts position addition input multiplexers adjacent to addition circuitry to minimize signal propagation delays, with input select lines for example routed through metal layer 2 or 3 of the interconnect stack. Such modification requires additional metal traces connecting configuration memory to these multiplexers, potentially necessitating routing through higher metal layers (for example metal 4 or 5) to avoid conflicts with existing signal paths. The configuration memory blocks may be positioned within critical timing paths, for example requiring placement within 200-300 micrometers of FMA units to ensure transformation constants can be delivered within the same clock cycle as the multiplication operands. This placement constraint may affect chip floor planning and may require moving other functional blocks to accommodate the positioning requirements, representing substantial changes to processor physical design beyond the original FMA unit architecture.

Further optionally, the hardware interconnect circuitry configuration addresses parallel data distribution. As previously described, the hardware interconnect circuitry 140 connects outputs of the first FMA unit to inputs of subsequent FMA units. The scheduling controller 120 configures this interconnect circuitry to enable at least two of the subsequent FMA units to receive input data in parallel during a single clock cycle. After the first FMA unit 110*a* computes the intermediate processing variable y, this value must be routed to multiple subsequent FMA units that use y as an input. The interconnect circuitry includes fanout capability to broadcast the value of y to multiple destinations in parallel while simultaneously routing other inputs such as the original input value x and various restructured polynomial coefficients to the same FMA units from their respective source locations.

The parallel data distribution capability may allow achieving the latency reductions provided by concurrent FMA operation execution. Without such capability, data may need to be routed sequentially to different destinations, introducing additional clock cycles and eliminating the benefit of parallel operation. In systems-on-chip where multiple processing clusters or computational blocks exist, the interconnect circuitry may span multiple hierarchical levels, with local interconnects within processing clusters providing high-bandwidth low-latency communication between nearby FMA units and global interconnects between clusters providing communication across longer distances with potentially higher latency.

FIG. 2 illustrates a flowchart of a process for evaluating even polynomials in the hardware computing system 100 according to an embodiment. The process executes during runtime operation using the hardware components previously described in connection with FIG. 1. The process begins at step 200 where the scheduling controller 120 acquires a transformation constant and restructured polynomial coefficients optimized for FMA operations from the configuration memory 130. The acquisition involves generating read addresses based on a function identifier specifying which function is to be evaluated, reading the transformation constant 132 and restructured polynomial coefficients 134 from their designated storage locations, and loading these parameter values into working registers or buffers within the scheduling controller 120.

Step 200 may be performed only once per polynomial (sin, for example), for instance using hardware 120,130, while described below steps 202-208 are performed per invocation (e.g. trillions of times) using hardware 110.

The process proceeds to step 202 where an input value is received at a first FMA unit having dedicated multiplication circuitry and addition circuitry. The input value x arrives at the first FMA unit 110*a* through the processor's datapath, routed from a source register or memory location to the input ports of the first FMA unit through signal paths in the hardware interconnect circuitry 140. At step 204, the scheduling controller 120 configures the first FMA unit 110*a* to compute an intermediate processing variable by executing a multiply-add operation utilizing both the multiplication circuitry 112 and the addition circuitry 114 in a single hardware operation. As previously described, this involves routing the input value x to both multiplication input ports and routing the transformation constant $\alpha$ to the addition input port, with the FMA unit producing the intermediate processing variable $y=x^2+\alpha$.

The process continues to step 206 where the scheduling controller 120 allocates at least two additional FMA units to execute parallel FMA operations using the intermediate processing variable and independent inputs to generate intermediate polynomial terms. The allocation process involves the dependency analysis circuitry 124 analyzing computational dependencies among FMA operations required to complete the polynomial evaluation, identifying operations having independent inputs suitable for parallel execution, selecting available FMA units such as FMA units 110*b* and 110*c*, and configuring the hardware interconnect circuitry 140 to route input operands to the selected FMA units. The transformation constant $\alpha$ previously added during computation of the intermediate processing variable restructures the computational dependencies, enabling operations that would have strictly sequential dependencies under conventional evaluation to instead have independent inputs permitting parallel execution.

The identification of independent inputs may be performed by the dependency analysis circuitry 124 through examination of which operations consume which operands, with two operations having independent inputs when the set of operands consumed by one operation does not include any operand produced by the other operation and vice versa. This analysis may be performed statically during instruction decode or dynamically during instruction scheduling depending on processor architecture.

At step 208, the process performs additional FMA operations through the plurality of FMA units to process the intermediate polynomial terms and complete the polynomial evaluation. These additional operations include operations depending on results produced by the parallel operations executed at step 206, as well as potentially additional parallel operations if the polynomial degree and dependency structure permit. The scheduling controller 120 continues orchestrating execution by monitoring completion of FMA operations, determining when dependent operations become ready for execution as their input dependencies are satisfied, allocating available FMA units to ready operations, and sequencing operations according to dependency relationships. For a degree-2n polynomial, the complete evaluation process utilizes no more than n FMA operations total, achieved through the combination of productive utilization of the addition capability during the intermediate processing variable computation and the restructured dependencies enabling parallel execution.

Optionally, the transformation constant used in the process illustrated in FIG. 2 is determined through a specific computational methodology that ensures satisfaction of conditions enabling the operation count reduction. The transformation constant $\alpha$ is computed by deriving a relationship between the transformation constant and transformed polynomial coefficients based on expansion of polynomial terms. This derivation involves expressing the transformed polynomial P'(y) as $P'(y)=\Sigma_{i=o}^{n} a_i(y-\alpha)^i$ where the original even polynomial is $P(x)=\Sigma_{i=o}^{n} a_i x^{2i}$ and the substitution $y=x^2+\alpha$ is applied. Expanding the terms $(y-a)^i$ using binomial expansion yields expressions for transformed coefficients $a'_i$ in terms of $\alpha$, the original coefficients $a_i$, and binomial coefficients.

A constraint equation may be formulated to ensure a predetermined coefficient relationship among the transformed polynomial coefficients. This constraint equation embodies the condition enabling a fifth-degree polynomial segment to be computed using four FMA operations instead of five. The specific relationship requires that the product of certain transformed coefficients equals the product of other transformed coefficients, and substituting the expanded expressions for these coefficients in terms of a yields a polynomial equation in a. A value of the transformation constant is then determined that satisfies the constraint equation through solution of the cubic polynomial using analytical formulas, numerical root-finding algorithms, or other techniques suitable for solving polynomial equations.

This predetermined coefficient relationship that the transformation constant is selected to satisfy is what enables the reduction in FMA operations required for polynomial evaluation. By ensuring that transformed coefficients exhibit specific product relationships, the structure of the polynomial permits a factorization or evaluation sequence that deviates from the strictly sequential Horner method and instead enables some operations to proceed in parallel while reducing the total operation count. The transformation constant thus serves as a parameter bridging between the original polynomial coefficients provided as input and the restructured computational process achieving improved hardware efficiency.

During execution of the process illustrated in FIG. 2, the hardware processing system undergoes physical state changes as electrical signals propagate through circuits and memory elements transition between states. At step 200, transistors in the configuration memory switch states to output the transformation constant and restructured coefficients onto signal paths, causing voltage levels on these paths to change to represent the retrieved values. At step 204, when the first FMA unit computes the intermediate processing variable, the multiplication circuitry generates heat and consumes power as transistors switch to compute the product xx, and the addition circuitry similarly consumes power and generates heat while adding $\alpha$. These physical transformations of electrical energy into computational results and heat represent concrete physical effects. At step 206, when multiple FMA units execute concurrently, different regions of the semiconductor substrate are active simultaneously, with different power distribution patterns and thermal signatures compared to sequential execution. These physical differences in hardware operation, power consumption patterns, and thermal characteristics demonstrate that the invention provides concrete improvements to computer technology itself.

It is expected that during the life of a patent maturing from this application many relevant systems and devices will be developed and the scope of the term FMA unit and a controller is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A hardware processing system comprising:

a plurality of floating-point multiply-add (FMA) units each configured with dedicated multiplication circuitry and addition circuitry operating in parallel within each FMA unit;

a scheduling controller configured for instructing a degree-2n polynomial evaluation completed using no more than n FMA operations by:

acquiring a transformation constant ($\alpha$) and a plurality of restructured polynomial coefficients optimized for FMA operations, configuring a first FMA unit from the plurality of FMA units to compute an intermediate processing variable (y) by exploiting both the multiplication capability and the addition capability of the FMA unit simultaneously, wherein the transformation constant ($\alpha$) is added during computation of the intermediate processing variable ($y=x^2+\alpha$) where x is an input value of the first FMA, and allocating one or more additional FMA units from the plurality of FMA units to execute FMA operations using the intermediate processing variable, wherein the transformation constant ($\alpha$) restructures computational dependencies to enable calculation of intermediate polynomial terms by the one or more additional FMA units using the plurality of restructured polynomial coefficients.

2. The hardware processing system of claim 1, wherein the FMA operations compute a round $((a \times b)+c)$ operation in a single operation with a single rounding where a, b, and c are operands.

3. The hardware processing system of claim 1, wherein the one or more additional FMA units using independent inputs during a same clock cycle.

4. The hardware processing system of claim 1, wherein configuring the first FMA unit to compute the intermediate processing variable comprises computing $fma(x, x, \alpha)$ where $\alpha$ is the transformation constant.

5. The hardware processing system of claim 4, wherein the transformation constant $\alpha$ is determined by solving a third-degree polynomial equation derived from a coefficient relationship condition, where the product of a first transformed coefficient and a second transformed coefficient equals the product of a third transformed coefficient and a fourth transformed coefficient.

6. The hardware processing system of claim 1, wherein the degree-2n even polynomial represents an approximation of a trigonometric function selected from the group consisting of cosine functions and normalized sine functions.

7. The hardware processing system of claim 1, wherein the configuration memory stores a plurality of sets, each set comprising, corresponding to a different function, the following: (1) one of a plurality of transformation constants and (2) one of a plurality of groups each having a plurality of restructured polynomial coefficients, and wherein the scheduling controller selects among the plurality of sets based on a function identifier associated with a current computational workload.

8. The hardware processing system of claim 7, wherein each set is computed during a compilation phase or hardware configuration phase and remains fixed during runtime polynomial evaluation operations.

9. The hardware processing system of claim 1, wherein the one or more additional FMA units are allocated by computing a fifth-degree polynomial segment using four FMA operations, wherein the four FMA operations include at least two FMA operations that execute in parallel using independent inputs, and wherein a coefficient relationship condition specifies that the product of a second-degree coefficient and a fifth-degree coefficient equals the product of a third-degree coefficient and a fourth-degree coefficient.

10. The hardware processing system of claim 9, wherein computing the fifth-degree polynomial segment using four FMA operations comprises: computing a first intermediate result by multiplying an input value by itself and adding a first pre-computed offset based on the plurality of reconstructed polynomial coefficients; computing a second intermediate result by multiplying a first coefficient by the input value and adding a second coefficient, wherein the first intermediate result and the second intermediate result are computed in parallel during a same clock cycle; computing a third intermediate result by multiplying the first intermediate result by itself and adding a third pre-computed offset based on the plurality of reconstructed polynomial coefficients; and computing a fourth intermediate result by multiplying the third intermediate result by the second intermediate result and adding a fourth pre-computed offset based on the plurality of reconstructed polynomial coefficients.

11. The hardware processing system of claim 1, wherein the degree-2n even polynomial has degree twelve, and wherein the parallel FMA operations compute the polynomial using exactly six FMA operations.

12. The hardware processing system of claim 1, further comprising a compiler configured to analyze function requirements and generate the restructured polynomial coefficients by determining the transformation constant that satisfies relationships of the plurality of reconstructed polynomial coefficients.

13. The hardware processing system of claim 2, wherein each FMA unit performs multiplication and addition with a single rounding operation according to IEEE 754-2008 standard.

14. The hardware processing system of claim 1, wherein the transformation constant is stored in the configuration memory as a fixed hardware parameter determined during a hardware configuration phase prior to runtime operation, and wherein the scheduling controller retrieves the transformation constant from the configuration memory and routes it to an addition input of the first FMA unit.

15. The hardware processing system of claim 1, further comprising hardware interconnect circuitry connecting outputs of the first FMA unit to inputs of subsequent FMA units, wherein the scheduling controller configures the hardware interconnect circuitry to enable at least two of the subsequent FMA units to receive input data in parallel during a single clock cycle.

16. The hardware processing system of claim 1, wherein the plurality of FMA units are implemented as dedicated floating-point arithmetic circuits on a semiconductor substrate.

17. The hardware processing system of claim 1, wherein the one or more additional FMA units execute the FMA operations using the intermediate processing variable simultaneously.

18. A computer-implemented method for evaluating even polynomials in a hardware computing system, comprising:

performing a degree-2n even polynomial evaluation completed using no more than n FMA operations by:

acquiring, by a scheduling controller from a configuration memory, a transformation constant ($\alpha$) and a plurality of restructured polynomial coefficients optimized for floating-point multiply-add (FMA) operations;

receiving an input value at a first FMA unit from a plurality of FMA units, the first FMA unit having dedicated multiplication circuitry and addition circuitry;

configuring the first FMA unit to compute an intermediate processing variable (y) by executing a multiply-add operation that utilizes both the multiplication circuitry and the addition circuitry in a single hardware operation, wherein the transformation constant ($\alpha$) is added during computation of the intermediate processing variable ($y=x^2+\alpha$) where x is an input value of the first FMA;

allocating, by the scheduling controller, at least two additional FMA units from the plurality of FMA units to execute parallel FMA operations using the intermediate processing variable and independent inputs to generate intermediate polynomial terms, wherein the transformation constant ($\alpha$) restructures computational dependencies to enable parallel calculation of the intermediate polynomial terms; and performing additional FMA operations through the plurality of FMA units to process the intermediate polynomial terms using the plurality of restructured polynomial coefficients and complete the polynomial evaluation.

19. The method of claim 18, wherein determining the transformation constant comprises optimizing the transformation constant to satisfy a condition that restructures the polynomial to enable efficient evaluation using reduced FMA operations.

* * * * *